United States Patent [19]

Bose et al.

[11] Patent Number: 4,949,912
[45] Date of Patent: Aug. 21, 1990

[54] FILM TRANSFER AND EDIT ADAPTOR

[76] Inventors: Scott Bose, 4348 Danbury La., Racine, Wis. 53403; Steven Klindworth, 1451 Bayview Dr., Hermosa Beach, Calif. 90254

[21] Appl. No.: 173,320

[22] Filed: Mar. 25, 1988

[51] Int. Cl.⁵ .......................................... B65H 16/04
[52] U.S. Cl. ................................. 242/68.3; 242/55.18; 242/71.8
[58] Field of Search ................... 242/55.18, 68.1, 68.3, 242/71.8, 200, 201

[56] References Cited

U.S. PATENT DOCUMENTS

| | | | |
|---|---|---|---|
| 928,443 | 7/1909 | Gillespie | 242/55.18 |
| 1,927,343 | 9/1933 | Heil | 206/59 |
| 2,106,726 | 11/1935 | Draeger | 242/71 |
| 2,560,897 | 2/1951 | Lindeman, Jr. | 242/55.18 X |
| 3,002,610 | 10/1961 | Granger | 206/52 |
| 3,245,631 | 4/1966 | Pitts | 242/68.3 X |
| 3,606,188 | 9/1971 | Wagner | 242/68.3 |
| 3,612,233 | 10/1971 | Nagpal, et al. | 190/57 |
| 3,661,337 | 5/1972 | Burth | 242/55.19 |
| 3,724,772 | 4/1973 | Hager et al. | 242/71.8 X |
| 3,780,959 | 12/1973 | Burth | 242/55.18 |
| 3,785,482 | 1/1974 | Preston | 206/53 |
| 3,823,890 | 7/1974 | Potts | 242/55.18 |
| 3,963,287 | 6/1976 | Rumble | 312/197 |
| 3,993,260 | 11/1976 | Bauer, Sr. | 252/55.18 |
| 4,030,675 | 6/1977 | Eissfeldt | 242/55.18 |
| 4,169,566 | 10/1979 | Boudouris, et al. | 242/55.18 |
| 4,244,535 | 1/1981 | Moodie | 242/71.8 |
| 4,475,652 | 10/1984 | Heard | 206/409 |
| 4,754,878 | 7/1988 | Bose | 242/71.8 X |

OTHER PUBLICATIONS

"Short Takes", *Box Office,* Dec. 1987 (pertinent pages attached).

*Primary Examiner*—Stuart S. Levy
*Assistant Examiner*—Steven M. duBois
*Attorney, Agent, or Firm*—Peter N. Jansson, Ltd.

[57] ABSTRACT

A film transfer and edit adaptor for facilitating the moving, reviewing and editing on spindle capable systems of a film set up for platter system projecting equipment, the adaptor including a support plate for the film, a cover plate for protecting the film, at least one fastening means for removably securing the cover plate to the support plate, a stem having sidewalls and a central bore, the central bore slidably engageable with the spindle system, and a locking means for lockingly engaging the stem with the spindle system.

13 Claims, 3 Drawing Sheets

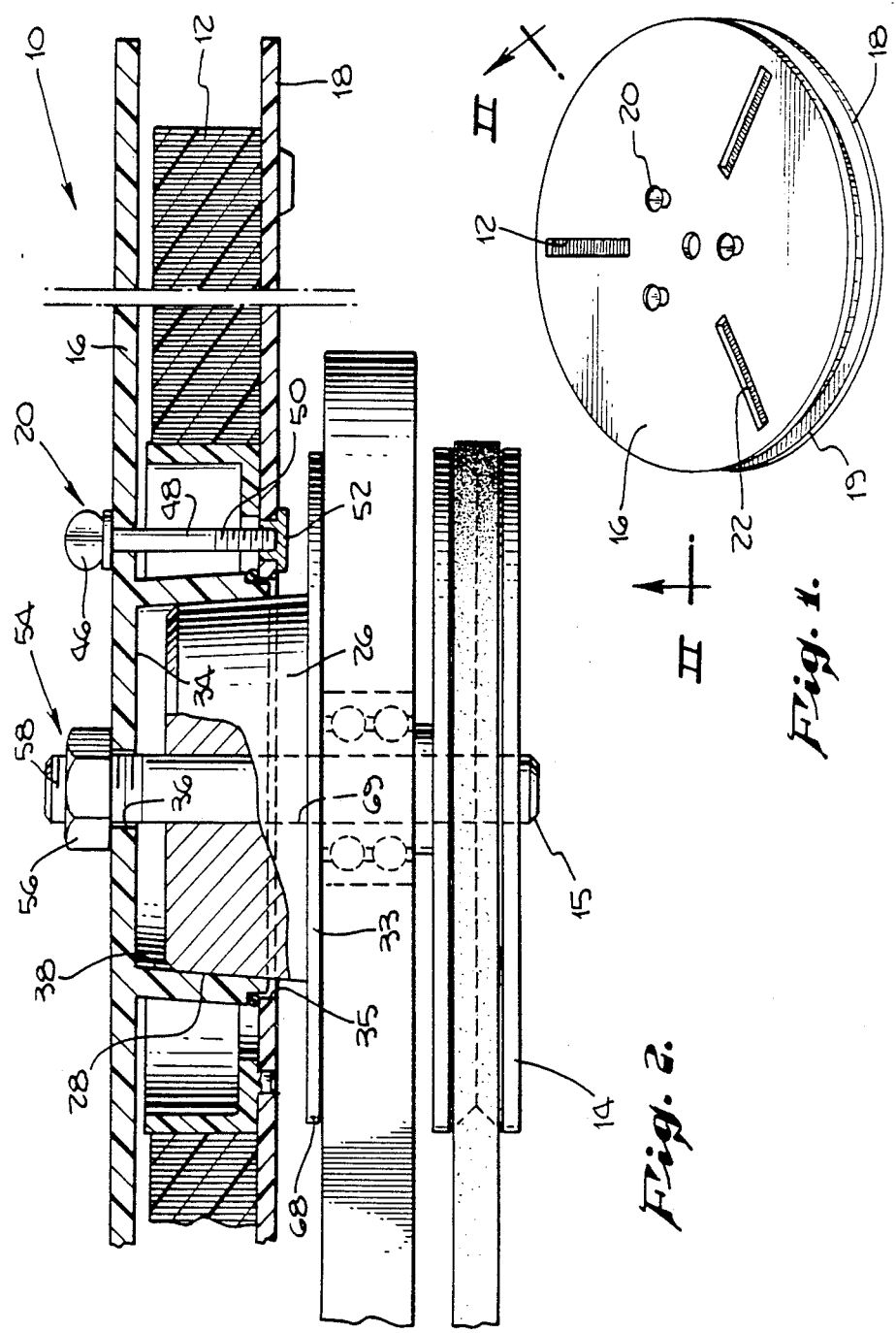

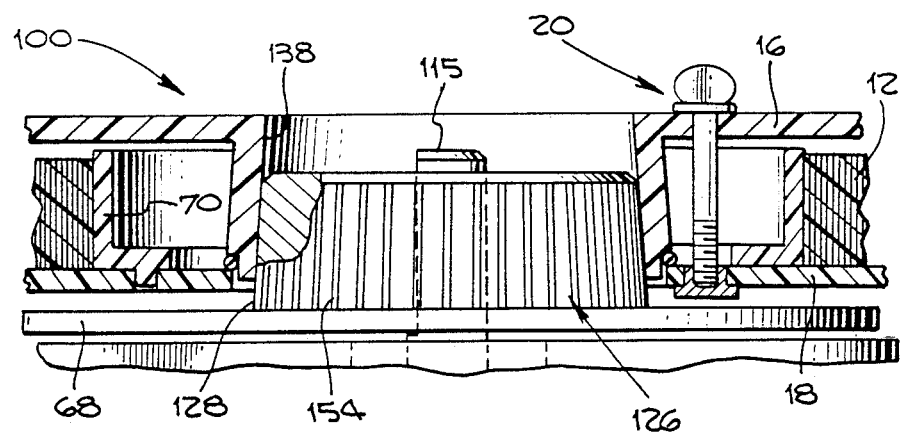
Fig. 4.
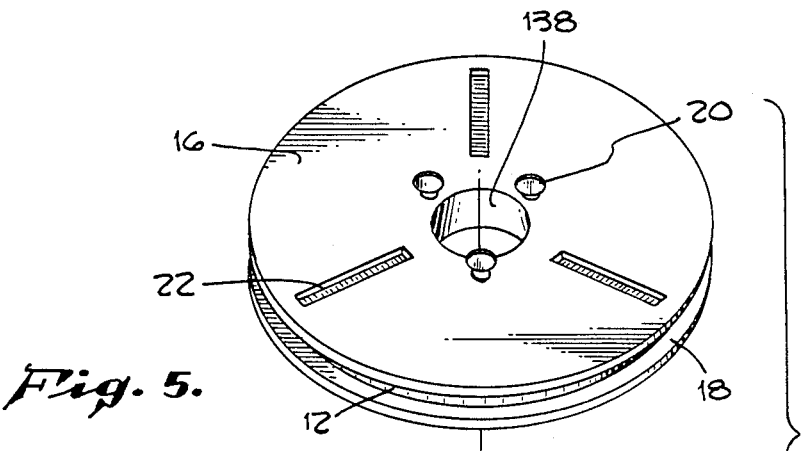
Fig. 5.
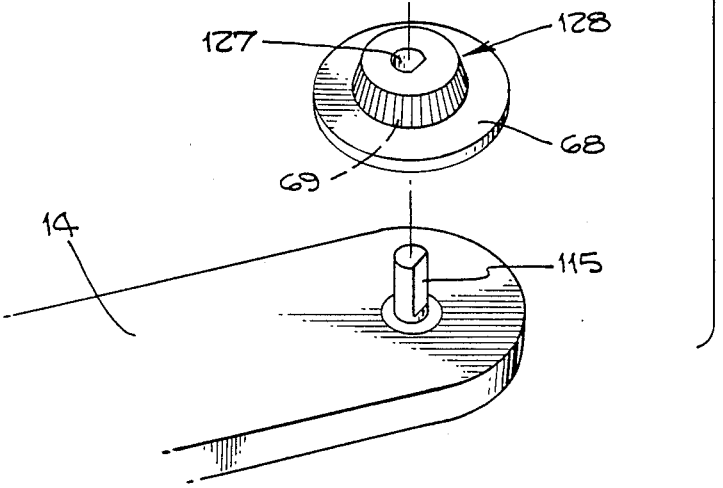

4,949,912

1

FILM TRANSFER AND EDIT ADAPTOR

FIELD OF THE INVENTION

This invention relates generally to the transferring and editing of tapes or film, and more particularly, to a film transfer and edit adaptor for facilitating the moving, reviewing and editing on spindle capable systems of films set up for continuous play or platter systems.

BACKGROUND OF THE INVENTION

Motion picture projection facilities and other continuous play systems involving tapes or film often utilize open turntable-type equipment or platter systems. The platter system allows the full and complete film or tape to rest in a single horizontal coil on a large platter. In a simplified explanation, as the platter rotates, the film unwinds from the coil center and is driven to the projection heads of a projection system. After passing the heads, the film is delivered to a second platter and the film is recoiled thereon. Such systems are well known in the prior art and more detailed explanations thereof can be found in a number of U.S. Patents, for example, U.S. Pat. Nos. 3,780,959, 3,823,890, 4,030,675 and 4,169,566.

The platter systems, have greatly simplified the projection aspects of film and tape rewind and display Such simplification includes the obviation of multiple projectors and constant handling of individual film reels. The shipping and handling of full length tapes, as opposed to several individually coiled film reels, is disclosed in pending U.S. Letters Patent No. 4,754,878.

It often becomes necessary, however, to replace certain reels of film from the entire feature, or edit certain parts therefrom. Film wear can occur from exposure to various environmental conditions within the projection or play area, and damage can also occur due to system malfunction or human error. The replacement of reels or lengths of film, the editing and splicing of film, or the deletion of segments from the film must be done on a system separate from the platter turntables. Typically, a separate rewind or make-up table is used. The rewind table, or its equivalents, are traditionally basic spindle systems; and consequently, the film must be wound, or rewound, from the platter onto smaller individual film reels. The smaller reels are capable of fitting on a spindle. This transition or breakdown is performed by feeding the film onto an individual reel contained on a rewind or make-up table. Again, the make-up table typically includes a conventional spindle type motor system. A second discrete film reel is then placed upon the rewind table on another separate spindle and the desired film improvements are made. After making such improvements the film is re-spliced together and wound back onto the platter as a single large unitary coil by winding.

The necessity of rewinding onto an individual reel not only is inefficient, but it also allows for human error and additional touching of the film. Splicing of the film, and any handling for that matter, dramatically increase the potential exposure of a film to dirt and other hazardous environmental conditions. Damage may result.

SUMMARY OF THE INVENTION

Accordingly, it is an object of the present invention to provide a film transfer and editing device obviating the need to transfer the film onto separate individual reels.

2

It is another object of the present invention to provide an editing adaptor enabling the large film coil to be placed directly upon a conventional make-up or rewind table.

It is yet another object of the present invention to provide an editing device compatible with existing spindle type system rewind and make-up machines And it is a further object of the present invention to provide a protective covering for the film during transfer and editing Generally stated, the present invention of a film transfer and edit adaptor for facilitating the moving, reviewing and editing on spindle capable systems of a film set up for platter system projection equipment includes a support plate for the film, a cover plate for protecting the film, at least one fastening means for removably securing the cover plate to the support plate, a stem having sidewalls and a central bore, the central bore slidably engageable with the spindle system, and a locking means for lockingly engaging the stem with the spindle system.

In the preferred embodiment of the instant invention, the support plate has a film support surface, a base surface and a plate aperture, the support surface including at least one receptacle and being of an otherwise substantially smooth nature. A cover plate is provided for protecting the film, and the cover plate has a cover aperture and an annular engaging surface. The annular engaging surface is mounted upon an inner surface of the cover plate and is concentric with, and radially outward from, the cover aperture. A cylindrical stem has sidewalls, an inverted funnelled configuration and a central bore. The central bore is slidably engageable with the spindle system and the sidewalls are capable of forming a frictional fit with the annular engaging surface. An inner ring is removably secured to the support plate and has a means for film attachment. The inner ring is demountably concentric about the plate aperture and is spaced radially outward from the annular engaging surface. At least one fastening means is provided for securing the cover plate to the support plate at the at least one receptacle such that the cover plate is spatially positioned above the film and the support plate and is also concentric therewith. The at least one fastening means is positioned in a spacial relationship about the cover aperture and the plate aperture A locking means is also provided for lockingly engaging the stem with the spindle system at the central bore. An apron drum is positioned adjacent the stem and concentric therewith, the drum also having a middle bore mountable upon the spindle. The stem is placed upon the spindle system and the cover plate, and after being fastened to the support plate above the film thereby forming a movable reel, can be placed on the stem and the film edited on the traditional spindle capable film systems.

The foregoing may be explained in another way. U.S. Pat. No. 4,754,878 describes a container which is constructed and arranged for handling a feature length motion picture film as a single continuous strip rather than in several separate reels as has been the conventional practice. The upper main wall and the inner ring of this container are removable to permit the film confined in the container (and thereafter retained on the lower main wall) to be fed to the projector from the center outward. This structure is configured to be used on a horizontal turntable having a central hub of relatively large diameter.

However, occasions arise when the film retained on such lower main wall must be projected using the more prevalent conventional spindle-type systems. Such systems have a spindle of relatively small diameter. The inventive adaptor solves the problem created by these arrangements by providing a structure which uses the container support plate (the lower main wall as it is called in the aforementioned U.S. Patent) having a relatively large aperture, upon such a small diameter spindle.

It is believed that a better understanding of the present invention, as well as a recognition of how the present invention achieves the foregoing objects and attains various additional advantages will become apparent to those sufficiently skilled in the art from a consideration of the following detailed description of a preferred embodiment of the present invention. During the following detailed description, reference will be made to the appended sheets of the drawings, which will now first be briefly described.

BRIEF DESCRIPTION OF THE DRAWINGS

FIG. 1 is a side perspective view of a part of a film transfer adaptor in accordance with the present invention.

FIG. 2 is a side elevation view taken through plane II—II of FIG. and including the film device in accordance with the present invention.

FIG. 4 is cross-sectional view of an alternative embodiment of the present invention.

FIG. 5 is a partially exploded view of the alternative embodiment of FIG. 4.

DETAILED DESCRIPTION OF THE INVENTION

Figure 3:
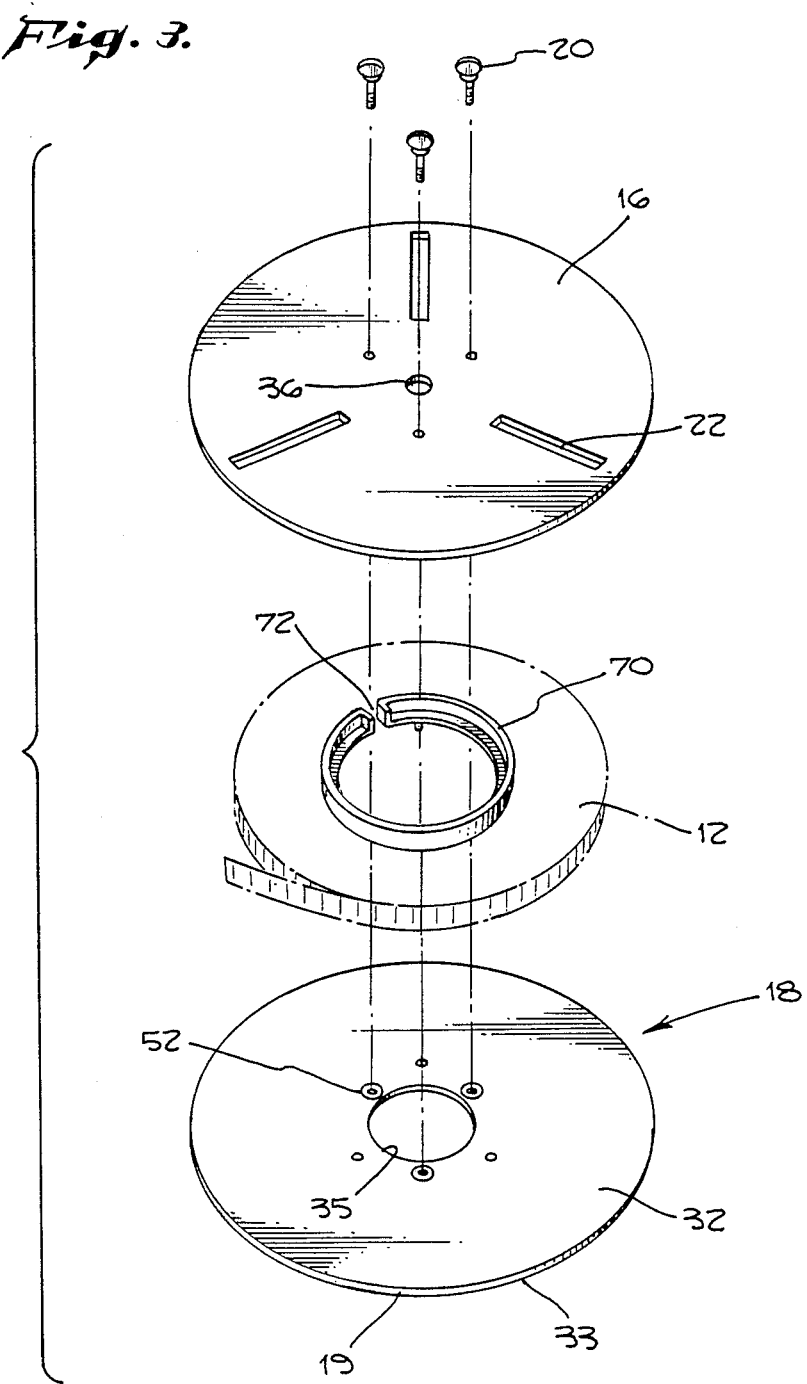
FIG. 3 is an exploded perspective view of a portion of FIG. 1.

Preliminarily, to best understand the present invention a description of the environment and circumstances of it use must be set forth. The platter or turntable-type system is in common use in the film industry today. In such systems, single, individual reels of film are spliced together and the entire film or tape then rests squarely upon the platter in a single unitary coil. The coil allows for an entire feature length film to be shown from a single projector. The film is drawn from one of the platters or turntables through the various mechanisms required for picture display and back on to a second platter. Because the film rests on a platter, in order to edit the film or change damaged frames it must be moved on to a rewind or make-up table.

The film transfer and edit adaptor 10, the instant invention, is utilized in order to lift the film 12 from the platter (not shown) and transfer it directly onto a conventional make-up or rewind apparatus 14 having a spindle 15. The film device 10 obviates the need for separate rewinding onto individual reels in order to utilize the spindle systems.

FIG. 1 shows cover plate 16 and support plate 18 held together by fastening means 20. Support plate 18 sits directly on the turntable or platter and film 12 rests on support plate 18 in a single coiled reel. It should be emphasized that support plate 18 may be slid underneath film 12 by having an edge 19 tapered (not shown). Accordingly, film 12 either rests directly on the platter during normal play, or may sit on support plate 18. When film transferring and editing is desired, cover plate 16 is placed on top of film 12, above support plate 18, thus forming a moveable reel. Cover plate 16 may also include at least one film slit 22. Film slit 22 allows an operator to see the film 12 and to view film length and reel load capacity.

Turning now to FIG. 2, FIG. 2 shows a side elevation view of the present invention as taken through plane II—II of FIG. 1. As previously mentioned, at least one fastening means 20 is provided for securing the cover plate 16 to support plate 18. Fastening means 20 is limited in form or substance only to the extent that it must not interfere with film 12 as film 12 is wound or unwound from film adaptor 10. In the preferred embodiment, fastening means 20 takes the form of a wing nut having finger tabs 46 and shank portion 48. Nut portion 48 may include a threaded bottom 50 which is engagingly receivable in least one receptacle 52. At least one receptacle 52 is positioned adjacent to, or may be integral with support plate 18. Again, fastening means 20 allows for cover plate 16 and support plate 18 to form a moveable reel containing film 12. This reel can then be placed upon a stem 26 having sidewalls 28 which is attached to the rewind apparatus 14 at spindle 15. Support plate 18 precludes film 12 from uncoiling from adaptor 10. Cover plate 16 is provided to, inter alia, protect film 12. Cover plate 16 also includes an inner surface 34, a cover aperture 36 and an annular engaging surface 38. The annular engaging surface 38 is provided so as to form a frictional fit with sidewall 28 of stem 26.

Addressing stem 26 with more particularity, stem 26 has an inverted funnelled configuration, as is shown in FIG. 2. Stem 26 also has a cylindrical cross section configuration. It should be noted that it is contemplated that stem 26 may take on any polygonal shape, including, but not limited to a rectangular shape, hexagonal shape and triangular shape. Moreover, while in the preferred embodiment of FIG. 2 a funnelled configuration exists on stem 26, stem 26 is not limited thereto. Similarly, annular engaging surface 38, though shown in FIG. 2 to be a number of degrees from perpendicular to inner surface 34, is not so limited. By way of example, and not by limitation, annular engaging surface 38 may be perpendicular to inner surface 34. In such an alternative configuration, stem 26 may change cross-sectional shape as well. However, the user of the adaptor 10 will find that it can be most conveniently assembled to stem 26 if the stem has a circular cross-section and is tapered slightly, both as shown in FIG. 2. It is important, however, that when cover plate 16 and support plate 18 are placed onto spindle 15 after stem 26 is placed onto spindle 15 that annular engaging surface 38 forms a frictional fit with the sidewalls 28 of stem 26. Plate aperture 35 is provided with a perimeter greater than the perimeter of stem 26 so that support plate 18 can slide down and onto stem 26.

Referring still to FIG. 2, locking means 54 is provided for lockingly engaging stem 26 with spindle 15 of apparatus 14. In the preferred embodiment, as shown in FIG. 2, locking means 54 comprises a nut and bolt connection 56 with the top of spindle 15. In such a circumstance, spindle 15 has a threaded top portion 58. It should be understood that in the preferred embodiment locking means 54 also ensures that cover plate 16 and support plate 18 do not become disengaged from the apparatus 14 at stem 26. As an additional example, locking means 54 may be integral with stem 26, and take the form of a set screw. Again, locking means may be any type of mechanical, frictional, magnetic, or other, engaging method.

As is best seen in FIG. 3, at least one fastening means 20 is positioned in a spatial relationship about cover aperture 36 and is also positioned radially outward from annular engaging surface 38 (as best shown in FIG. 2). At least one receptacle 52 is positioned radially outward from plate aperture 35 of support plate 18. Support plate 18 includes a film surface 32 and a base surface 33. Base surface 33 is adjacent to an apron drum 68 (best shown in FIG. 2). Apron drum 68 includes middle bore 69 which is mountable upon spindle 15. Apron drum 68 affords structural support for base surface 33 of support plate 18.

Turning now to FIG. 4, FIG. 4 shows a cross-sectional view of an alternative embodiment of the present invention. Film transfer adaptor 100 being generally indicated with the same parts having the same reference numerals as the film transfer adaptor 10 heretofore described with regard to FIGS. 1–3. In this alternative embodiment, film transfer adapter 100 includes a stem 126 mountable upon spindle 115. In this alternative embodiment spindle 115 is shown to have an altered cross section such that locking means 154 is in fact the altered configuration. Alternatively, locking means 154 may be integral with stem 126, e.g., a set screw.

Sidewalls 128 of stem 126 are notched, as is annular engaging surface 138. Notching of these two surfaces allows for a secure connection during film rewinding or editing and further ensures that the cover plate 16 and support plate 18, held together as a reel by fastening means 20, remain engaged with stem 118 for smooth rewinding and editing. It should be understood that cover aperture 36 may be deleted (as shown in FIG. 4) for example, when the alternative embodiment is employed. This deletion is possible because of the alternative embodiment of locking means 154.

Inner ring 70 is discussed in detail in U.S. Letters Pat. No. 4,754,878, and accordingly, does not form a part of this invention.

Turning finally to FIG. 5, FIG. 5 is a partially exploded view of the alternative embodiment of FIG. 4. FIG. 5 is indicative of the present invention in application. Specifically, stem 126 and an apron drum 68 are slidably engaged with spindle 115 through central bore 127 and middle bore 69, respectively. After stem 126 and drum 68 are placed onto spindle 115, cover plate 16 and support plate 18, which are removably secured by at least one fastening means 20, are moved containing film 12 onto stem 126. Annular engaging surface 138 ensures a secure and effective fit. Locking means 54 lockingly engages stem 126 to spindle 115 at central bore 127 and rewinding or editing may be initiated.

Having thus described a preferred exemplary embodiment and an alternative embodiment of a film transfer and editing device, it should be apparent to those skilled in the art that various additional objects and advantages have been attained by the within invention and that a variety of modifications, adaptations and equivalent constructions can be made within the scope and spirit of the present invention, being limited only by the appended claims.

What is claimed is:

1. A dual-element film transfer and edit adaptor for facilitating the moving, reviewing and editing on spindle type systems of a film set p for platter system projection equipment, said film adaptor comprising:
    a support plate for said film;
    an apron drum with a stem having sidewalls and a central bore, said central bore being slidably engageable with said spindle system;
    a cover plate for protecting said film, said cover plate having an annular engaging surface mounted upon said cover plate, said annular engaging surface being capable of forming a friction fit with said sidewalls of said stem;
    at least one fastening means for removably securing said cover plate to said support plate, said fastening means being positioned concentrically inward from said film;
    a locking means for lockingly engaging said stem with said spindle system;
    whereby said stem can be placed onto said spindle system and said cover plate, after being fastened to said support plate above said film to form a moveable reel, can be placed on said stem and said film edited using said spindle system.

2. The film transfer device as defined in claim 2, wherein said annular engaging surface is positioned concentric with, and radially outward from, said cover aperture.

3. The film adaptor as defined in claim 1, wherein said support plate further comprises:
    plate surfaces defining an aperture having a perimeter greater than the perimeter of said bottom portion of said stem and capable of mountably surrounding said stem.

4. A dual element film transfer and edit adaptor for facilitating the moving, reviewing and editing on spindle capable systems of a film set up for platter system projection equipment, said film adaptor comprising:
    a separate stem having sidewalls and a central bore, said central bore slidably engageable with said spindle system;
    a locking means for lockingly engaging said stem with said spindle system;
    a support plate for said film, said support plate having a film support surface, a base surface and plate surfaces defining a plate aperture, said plate aperture having a perimeter greater than the perimeter of said stem and capable of mountably surrounding said stem;
    a cover plate for protecting said film, said cover plate having an inner surface, cover surfaces defining a cover aperture and an annular engaging surface, said annular engaging surface mounted upon said inner surface, concentric with and positioned radially outward from said cover aperture and capable of forming a frictional fit with said sidewalls of said separate stem;
    at least one fastening means for removably securing said cover plate to said support plate, said fastening means positioned concentrically inward from said film;
    whereby said stem can be locked on to said spindle system and said cover plate after being fastened to said support surface can be placed on said stem and said film edited thereon.

5. The film adaptor as defined in claim 4, wherein said support plate further comprises:
    an inner ring removably secured to said support plate, said inner ring demountably concentric about said plate aperture and spaced radially outward from said annular engaging surface and having an attaching means for film attachment.

6. The film adaptor as defined in claim 4, wherein said film device further comprises:
an apron drum positioned adjacent said stem and concentric therewith, said drum having a middle bore.

7. The film adaptor as defined in claim 4, wherein said stem is of an inverted funnelled configuration having a cylindrical cross section.

8. The film adaptor as defined in claim 4, wherein said stem has knolled sidewalls.

9. A dual element film transfer and edit adaptor device for facilitating the moving, reviewing and editing on spindle capable system of a film set up for platter system projection equipment, said film adaptor comprising:
a support plate for said film, said support plate having a film support surface, a base surface and plate surfaces defining an aperture, said support surface including at least one receptacle and being of an otherwise substantially smooth nature;
a cover plate for protecting said film, said cover plate having cover surfaces defining an aperture and an annular engaging surface, said annular engaging surface mounted upon an inner surface of said cover plate and concentric with and radially outward from said cover aperture;
a separate cylindrical stem having sidewalls, an inverted funnelled configuration and a central bore, said central bore slidably engageable with said spindle system and said sidewalls capable of forming a frictional fit with said annular engaging surface;
an inner ring removably secured to said support plate and having a means for film attachment, said inner ring demountable concentric about said plate aperture and spaced radially outward from said annular engaging surface; and
at least one fastening means for securing said cover plate to said support plate at said at least one receptacle such that said cover plate is spatially positioned above said film and said support plate and is also concentric therewith, said at least one fastening means positioned in a spatial relationship about said cover aperture and said plate aperture;
a locking means, for lockingly engaging said stem with said spindle system at said central bore;
an apron drum positioned adjacent said stem and concentric therewith, said drum also having a middle bore, said middle bore mountable upon said spindle;
whereby said stem can be placed upon said spindle system and said cover plate after being fastened to said support plate above said film forming a movable reel, can be placed on said stem and said film edited thereon.

10. An adaptor for facilitating the use of a spindle-type projection system of the type having a relatively small diameter support spindle for reviewing and editing motion picture film transported within a container having a lower main wall support plate with a central aperture of relatively large diameter for mounting the container upon a turntable type projection system, the container further including an inner ring concentric with the aperture for winding film thereon, the adaptor including:
an apron drum having a stem projecting therefrom, the stem having a dimension selected to be received in the central aperture with clearance, the aperture and the stem defining an annular space therebetween;
a cover plate having a side wall projecting therefrom and sized to frictionally engage the stem, the side wall extending toward the annular space defined by the aperture and the stem;
the support plate and the cover plate each including an aperture therethrough which is sized to receive the spindle of a spindle-type projection system with slight clearance;
fastening means for coupling the support plate and the cover plate in a parallel spaced relationship for confining film therebetween;
locking means for securing the apron drum, the support plate and the cover plate to the support spindle;
the adaptor thereby facilitating the use of the spindle-type projection system for reviewing film transported in a container configured for a turntable type projection system.

11. The adaptor of claim 10 wherein the stem has a generally circular cross-sectional shape.

12. The adaptor of claim 10 wherein the locking means is embodied as a threaded fastener in engagement with the spindle for retaining the cover plate, the support plate and the apron drum on the spindle.

13. The adaptor of claim 10 wherein the locking means is embodied as interfaced, coacting flat surfaces formed on the spindle and the stem, the flat surfaces thereby preventing relative rotation between the spindle and the apron drum.

* * * * *

UNITED STATES PATENT AND TRADEMARK OFFICE
CERTIFICATE OF CORRECTION

PATENT NO. : 4,949,912
DATED : August 21, 1990
INVENTOR(S) : Scott Bose and Steven Klindworth It is certified that error appears in the above-identified patent and that said Letters Patent is hereby corrected as shown below:

In Column 1, Line 26, insert --.-- after the word display.

In Column 4, Line 12, change "Wound" to --wound--.

In Column 4, Line 14, delete "portion" at the first occurence.

In Column 5, Line 66, change "p for" to --up for--.

In Column 6, Line 20, change "claim 2" to --claim 1--.

Signed and Sealed this

Fourth Day of February, 1992

Attest:

HARRY F. MANBECK, JR.

*Attesting Officer*     *Commissioner of Patents and Trademarks*